Jan. 26, 1932.  C. J. McLEOD  1,842,555

LUBRICATING DEVICE FOR VALVE STEM BEARINGS

Filed April 10, 1928

INVENTOR

Clifford J. McLeod

Patented Jan. 26, 1932

1,842,555

UNITED STATES PATENT OFFICE

CLIFFORD J. McLEOD, OF QUINCY, MASSACHUSETTS

LUBRICATING DEVICE FOR VALVE STEM BEARINGS

Application filed April 10, 1928. Serial No. 268,971.

My invention relates to improvements in lubricating device for valve stem bearings of the type used for internal combustion engines; and the objects of my improvements are, first, to provide means for lubricating the valve stem bearings; and second, to provide means for preventing the lubricating material from flowing onto the valve and the valve seat.

Figure 1:
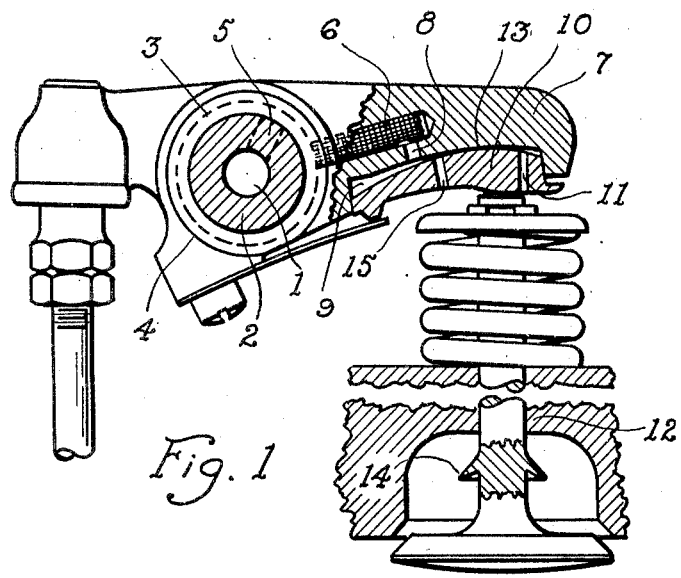
Figure 2:
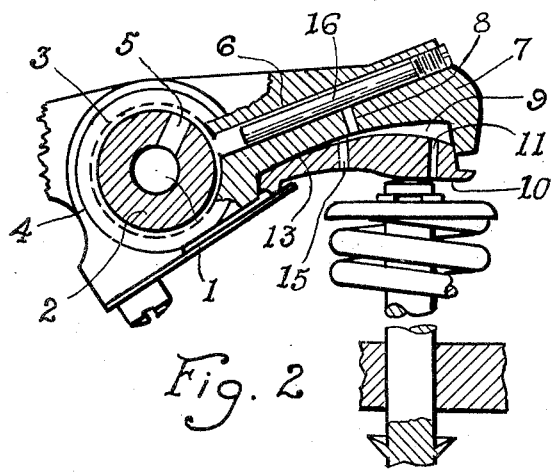

I attain these objects by the mechanism illustrated in the accompanying drawings, in which:

Fig. 1 is a view of a valve and a portion of the valve actuating mechanism to which this invention is applied. Fig. 2 is a view of the lubricating mechanism shown in the position which it takes when the valve is being held open.

The channel 1 in the tubular shaft 2 shown in Figures 1 and 2 forms a portion of a passageway through which oil is conveyed from a pressure pump to serve as a lubricant as hereinafter described.

The pressure pump and passage way may be of ordinary construction which need not be shown or described.

The opening 5 in the wall of the shaft 2, the annular recess 3 in the hub 4 of the rocker bar, the channel 6 and the opening 8 in the arm 7 of the rocker bar, the space 9 lying between the rocker bar and the rocker shoe 10 and the opening 11 in the rocker shoe 10 form a passage way for the oil to flow from the channel 1 to the valve stem.

In accordance with this invention the space 9 lying between the rocker shoe and the arm 7 of the rocker bar, inclines upwards from the opening 8 to the opening 11 thus requiring the forward and backward movement of the contact point 13 of the rocker shoe 10 with the arm 7 of the rocker bar to carry the oil entering the space 9 through the opening 8 to the opening 11, through which it flows onto the valve stem and into the valve stem bearing. The opening 11 is preferable but may be omitted as the space at the outer end of the rocker shoe 10 would form an exit from the space 9 through which oil may flow to the end of the valve stem.

The opening 15 in the shoe 10 serves as a drain to carry oil from the space 9 away from the valve stem while the engine is at rest, thus the supply of lubricant ceases when the engine stops running.

As shown in Fig. 1 a plug is located and arranged within the longitudinally extending channel 6 so that it lies upon the entrance to the downward extending channel 8 and serves to prevent the passage of sediment and also to obstruct the channel 6 and the entrance to the channel 8, whereby to diminish the flow of oil through the said channels toward the end of the valve stem. Since it is necessary to limit the flow of oil to a very small quantity to avoid excessive oiling of the valve stem and consequent flooding of the valve and valve seat, it is desirable that said plug be composed of hard felt or the like or in lieu of hard felt, a solid plug slightly smaller in diameter than the diameter of the channel wherein it lies may be employed. As shown in Fig. 2 said plug may be threaded into the wall of said channel.

Due to different grades of oil which may be used, and to heat absorbed by the oil, it is not possible by any mechanism to supply a uniform flow of oil to properly lubricate the valve stem bearings under all conditions which might ensue; and a farther object of this invention is to prevent excess lubricant from flowing onto the valve and valve seat, which is accomplished by the flange 14 on the valve stem, shown in Fig. 1. Excess oil dripping from the edge of the said flange is carried away by the onrushing gas, thus it is prevented from flowing onto the valve and valve seat.

The location of the opening 8, 11 and 13 may vary widely from that shown to best accomplish the results for which they are provided. The flange on the valve stem may be inverted to accomplish a similar purpose.

I claim:

1. The combination of the valve actuating rocker bar mounted on a tubular shaft, a rocking shoe mounted on an arm of the said rocker bar and engaging the valve stem, an oil channel leading from the channel within the tubular shaft to the space lying between the rocking shoe and the arm of the rocker bar and an exit from said space through which oil may flow onto the valve stem.

2. The combination of the valve actuating rocker bar mounted on a tubular shaft, a rocking shoe mounted on an arm of the said rocker bar and engaging the valve stem, a passageway leading from the channel within the tubular shaft to the space lying between the rocking shoe and the arm of the rocker bar, an exit leading from said space through which oil may flow onto the valve stem and an exit from said space through which oil may flow away from the valve stem.

3. The combination of the valve actuating rocker bar mounted on a tubular shaft, a rocking shoe mounted on an arm of the said rocker bar and engaging the valve stem. A passageway leading from the channel within the tubular shaft to the space lying between the rocking shoe and the arm of the rocker bar. A non-porous plug fitted loosely to and lying within said passageway and an exit leading from said space through which oil may flow onto the valve stem.

4. The combination of the valve actuating rocker bar mounted on a tubular shaft, a rocking shoe mounted on an arm of said rocker bar and engaging the valve stem, a passageway leading from the channel within the tubular shaft to the space lying between the rocking shoe and the arm of the rocker bar; said passageway having a longitudinally extending portion within the arm of the rocker bar and a downward extending portion being smaller than and leading from said longitudinally extending portion and a non-porous plug loosely fitted thereto and lying within said longitudinally extending portion and lying upon and across the entrance to said downward extending portion.

5. The combination of the valve actuating rocker bar mounted on a tubular shaft, a rocking shoe mounted on an arm of said rocker bar and adapted to engage the valve stem, an oil channel leading from the interior of said tubular shaft to the bearing thereon which supports the said rocker bar and a channel leading from the said bearing to the space lying between the said rocking shoe and the arm of the rocker bar.

6. The combination of the valve actuating rocker bar mounted on a tubular shaft, a rocking shoe mounted on an arm of the said rocker bar and adapted to engage the end of the valve stem and means for rocking said shoe a passage leading from the interior of the said tubular shaft to the bearing thereon which supports the said rocker bar, and a passage leading from the said bearing to the under face of the arm on the said rocker bar which supports the rocking shoe.

7. The combination of the valve actuating rocker bar mounted on a tubular shaft, a rocking shoe mounted on an arm of said rocker bar and adapted to engage the valve stem; and means for rocking said shoe, a passage leading from the interior of the said tubular shaft to the bearing thereon which supports the said rocker bar and a passage leading from the said bearing to the exterior surface of the said rocker bar.

CLIFFORD J. McLEOD.